US012638889B2

(12) United States Patent
Zhang et al.

(10) Patent No.: US 12,638,889 B2
(45) Date of Patent: May 26, 2026

(54) FOLDABLE ASSEMBLY OF ELECTRONIC DEVICE AND ELECTRONIC DEVICE

(71) Applicant: Honor Device Co., Ltd., Shenzhen (CN)

(72) Inventors: Yaolei Zhang, Shenzhen (CN); Mingqian Gao, Shenzhen (CN); Yilin Lu, Shenzhen (CN); Haifei Li, Shenzhen (CN); Leibo Yuan, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 402 days.

(21) Appl. No.: 18/252,051

(22) PCT Filed: Sep. 7, 2022

(86) PCT No.: PCT/CN2022/117457

§ 371 (c)(1),
(2) Date: May 8, 2023

(87) PCT Pub. No.: WO2023/040714

PCT Pub. Date: Mar. 23, 2023

(65) Prior Publication Data

US 2024/0004436 A1      Jan. 4, 2024

(30) Foreign Application Priority Data

Sep. 18, 2021    (CN) .......................... 202111112193.6

(51) Int. Cl.
*G06F 1/16* (2006.01)

(52) U.S. Cl.
CPC .......... *G06F 1/1681* (2013.01); *G06F 1/1616* (2013.01); *G06F 1/1652* (2013.01)

(58) Field of Classification Search
CPC ..... G06F 1/1616; G06F 1/1681; G06F 1/1652
See application file for complete search history.

(56) References Cited

U.S. PATENT DOCUMENTS 9,348,450 B1 * 5/2016 Kim .................... H04M 1/0268
9,696,763 B2 * 7/2017 Mok .................... G06F 1/1679
(Continued)

FOREIGN PATENT DOCUMENTS

CN        201440768 U      4/2010
CN        107632661 A      1/2018
(Continued)

*Primary Examiner* — Anthony M Haughton
*Assistant Examiner* — Rashen E Morrison
(74) *Attorney, Agent, or Firm* — Conley Rose, P.C.

(57) ABSTRACT

A foldable assembly of an electronic device and an electronic device. The electronic device may be a terminal product that includes a foldable flexible display, such as a mobile phone, a tablet computer, a wearable device, a vehicle-mounted device, a virtual reality device, a notebook computer, a super mobile personal computer, a netbook, or a personal digital assistant. Support plates are respectively disposed between each door plate and the floating plate of the foldable assembly, and a protruding part and a recessed part are disposed on a side of the support plate facing the floating plate. In an unfolded state, a protruding part and a recessed part of two support plates correspondingly fit with each other. In a folded state, the protruding part is elastically bent and abuts against an upper end face of the floating plate, and the recessed part is separated from the floating plate.

20 Claims, 5 Drawing Sheets

(56) References Cited

U.S. PATENT DOCUMENTS

| | | | |
|---|---|---|---|
| 10,520,988 B2 * | 12/2019 | Hsu | G06F 1/1618 |
| 10,761,573 B2 * | 9/2020 | Hsu | G06F 1/1681 |
| 11,224,137 B2 * | 1/2022 | Hsu | E05D 11/0081 |
| 11,336,759 B2 | 5/2022 | Liao et al. | |
| 11,412,629 B2 * | 8/2022 | Hsu | H05K 5/0226 |
| 11,625,073 B2 * | 4/2023 | Shim | G06F 1/1652 |
| | | | 361/679.28 |
| 11,644,874 B2 * | 5/2023 | Kuramochi | G06F 1/1616 |
| | | | 361/679.27 |
| 11,832,405 B2 * | 11/2023 | Zhang | F16C 11/04 |
| 11,886,257 B2 * | 1/2024 | Kim | H04M 1/022 |
| 11,917,780 B2 * | 2/2024 | Caplow-Munro | H05K 5/0226 |
| 11,924,987 B2 * | 3/2024 | Lee | H04M 1/022 |
| 11,977,421 B2 * | 5/2024 | Yang | E05D 11/082 |
| 11,994,161 B2 * | 5/2024 | Liu | H05K 5/0226 |
| 12,130,668 B2 * | 10/2024 | Liu | G09F 9/301 |
| 12,221,998 B2 * | 2/2025 | Hsu | F16C 11/04 |
| 12,256,508 B2 * | 3/2025 | Zhang | G06F 1/1681 |
| 2014/0042293 A1 * | 2/2014 | Mok | G06F 1/1679 |
| | | | 248/682 |
| 2015/0233162 A1 | 8/2015 | Lee et al. | |
| 2018/0024589 A1 | 1/2018 | Nakamura et al. | |
| 2020/0103935 A1 * | 4/2020 | Hsu | G06F 1/1681 |
| 2020/0137907 A1 | 4/2020 | Kang et al. | |
| 2020/0293094 A1 * | 9/2020 | Liu | F16M 11/04 |
| 2021/0271294 A1 * | 9/2021 | Liao | G06F 1/181 |
| 2021/0307186 A1 * | 9/2021 | Hong | F16C 11/12 |
| 2022/0019270 A1 * | 1/2022 | Su | G06F 1/1681 |
| 2022/0104370 A1 * | 3/2022 | Wu | G06F 1/1681 |
| 2022/0137676 A1 * | 5/2022 | Tian | G06F 1/1616 |
| | | | 361/679.27 |
| 2022/0217859 A1 * | 7/2022 | Lee | G06F 1/1652 |
| 2022/0263931 A1 | 8/2022 | Ma et al. | |
| 2022/0303371 A1 * | 9/2022 | Liao | H04M 1/0216 |
| 2022/0345558 A1 | 10/2022 | Liu | |
| 2022/0377919 A1 * | 11/2022 | Zhang | H04M 1/022 |
| 2024/0004430 A1 | 1/2024 | Zhao et al. | |
| 2024/0004436 A1 | 1/2024 | Zhang et al. | |
| 2024/0094785 A1 | 3/2024 | Cheng et al. | |
| 2024/0147645 A1 * | 5/2024 | Zhang | F16C 11/04 |
| 2024/0364800 A1 * | 10/2024 | Dong | G06F 1/1681 |

FOREIGN PATENT DOCUMENTS

| | | |
|---|---|---|
| CN | 108363458 A | 8/2018 |
| CN | 208421695 U | 1/2019 |
| CN | 109658826 A | 4/2019 |
| CN | 109922181 A | 6/2019 |
| CN | 110491285 A | 11/2019 |
| CN | 111629087 A | 9/2020 |
| CN | 111698355 A | 9/2020 |
| CN | 111968513 A | 11/2020 |
| CN | 113067923 A | 7/2021 |
| CN | 113140156 A | 7/2021 |
| CN | 113194183 A | 7/2021 |
| CN | 213655447 U | 7/2021 |
| CN | 113286023 A | 8/2021 |
| CN | 113315860 A | 8/2021 |
| CN | 115842882 A | 3/2023 |
| CN | 115842883 A | 3/2023 |
| CN | 115883701 A | 3/2023 |
| CN | 115962217 A | 4/2023 |
| CN | 115842883 B | 10/2023 |
| CN | 116972063 A | 10/2023 |
| CN | 117255147 A | 12/2023 |
| CN | 117307593 A | 12/2023 |
| EP | 4063996 A1 | 9/2022 |
| EP | 4072110 A1 | 10/2022 |
| EP | 4311209 A1 | 1/2024 |
| EP | 4325819 A1 | 2/2024 |
| JP | 2018071715 A | 5/2018 |
| JP | 2018097420 A | 6/2018 |
| KR | 20200109722 A | 9/2020 |
| WO | 2020253601 A1 | 12/2020 |
| WO | 2021115462 A1 | 6/2021 |
| WO | 2021120670 A1 | 6/2021 |
| WO | 2021129407 A1 | 7/2021 |
| WO | 2021129882 A1 | 7/2021 |

* cited by examiner

1

FOLDABLE ASSEMBLY OF ELECTRONIC DEVICE AND ELECTRONIC DEVICE

CROSS-REFERENCE TO RELATED APPLICATIONS

This application is a U.S. National Stage of International Application No. PCT/CN2022/117457 filed on Sep. 7, 2022, which claims priority to Chinese Patent Application No. 202111112193.6, filed with the China National Intellectual Property Administration on Sep. 18, 2021, both of which are incorporated herein by reference in their entireties.

TECHNICAL FIELD

This application relates to the field of electronic product technologies, and in particular, to a foldable assembly of an electronic device and an electronic device.

BACKGROUND

With development of a flexible display technology, a flexible display (that is, a flexible display screen) is increasingly applied to an electronic device. In the electronic device, the flexible display and a foldable assembly are generally combined to implement folding and unfolding of the flexible display by using the foldable assembly, so as to form a folding screen of the electronic device.

The foldable assembly includes a rotating shaft part, a floating plate, and two door plates respectively disposed on two sides of the floating plate. The floating plate is disposed above the rotating shaft part, and the two door plates are pivotally connected to the rotating shaft part. The two door plates are respectively connected to the flexible display, and drive the flexible display to fold and unfold. The floating plate can provide support for the flexible display from a middle position.

The floating plate can float up and down relative to the rotating shaft part, and a groove structure is correspondingly disposed above the rotating shaft part. When the two door plates rotate and drive the flexible display to fold, the floating plate floats downward until the floating plate is at least partially located in the groove structure, so as to reduce an overall size after folding.

To ensure flatness between the door plate and the floating plate, a support plate is further disposed between the door plate and the floating plate. One side of the support plate is fastened to the door plate; and the other side is located on an upper end face of the floating plate, and may slide on the upper end face of the floating plate. However, after the door plate drives the flexible display to fold, the support plate is bent, and the floating plate floats downward. In this case, a side of the support plate facing the floating plate is easy to slide along the floating plate to a gap between the floating plate and the groove structure, and is stuck, to cause the flexible display not to be unfolded.

Therefore, when the door plate drives the flexible display to fold, how to avoid a case in which the support plate is inserted into a gap between the floating plate and the groove structure to cause sticking, and ensure that the door plate can smoothly rotate to drive the flexible display, to fold and unfold is a technical problem that needs to be resolved by a person skilled in the art.

SUMMARY

An object of this application is to provide a foldable assembly of an electronic device and an electronic device. When a door plate drives a flexible display to fold, a case in which a support plate is inserted into a gap between a floating plate and a groove structure to cause sticking can be avoided, thereby ensuring that the door plate can rotate smoothly to drive the flexible display to fold and unfold.

A first aspect of embodiments of this application provides a foldable assembly of an electronic device, including a rotating shaft part, a floating plate, and two door plates, where the rotating shaft part is provided with a groove structure, the floating plate is floatably disposed above the groove structure and is located between the two door plates, the door plate is configured to fix a flexible display of the electronic device, and the door plate can rotate around the rotating shall part to fold and unfold. A support plate is disposed between each door plate and the floating plate, the support plate includes a first connection part and a second connection part, the first connection part is connected to the door plate, second connection parts of two support plates are disposed opposite to each other, and a protruding part and a recessed part are disposed in the second connection part. In an unfolded state, the protruding parts and the recessed parts of the two support plates correspondingly fit and are located on an upper end face of the floating plate. In a folded state, the floating plate is at least partially located in the groove structure, the protruding part is elastically bent and abuts against the upper end face of the floating plate, and the recessed part is separated from the floating plate.

The second connection part is disposed as a structure that includes a protruding part and a recessed part, so that an overall width of the support plate can be increased. During folding, the protruding part slides along the floating plate and is in a folded state, Due to a relatively long length, the protruding part is still located on the upper end face of the floating plate after bending occurs, so as to avoid separating from the floating plate, thereby avoiding sticking, ensuring that the door plate can rotate smoothly, and the floating plate can be smoothly lifted and lowered, to ensure that the flexible display can be smoothly folded and unfolded.

Based on the first aspect, an embodiment of this application further provides a first implementation of the first aspect.

The two support plates have a same structure. In this way, only a support plate with s same structure needs to be produced, thereby facilitating bulk production, reducing a quantity of molds, simplifying production process, and reducing costs.

Based on the first aspect, an embodiment of this application further provides a second implementation of the first aspect.

The floating plate includes a wide segment and a narrow segment that are arranged along a length direction of the floating plate, a width of the wide segment is greater than a width of the narrow segment, a fitting segment is firmed at a position where the second connection part corresponds to the narrow segment, and the fitting segment is provided with the protruding part and the recessed part. A protruding segment and a recessed segment are correspondingly disposed at a position where a width of the floating plate is relatively small, so that a probability that sticking occurs during a folding process can be effectively reduced.

Based on the second implementation of the first aspect, an embodiment of this application further provides a third implementation of the first aspect.

The fitting segment is provided with a protruding part and a recessed part. In this way, quantities of protruding parts and recessed parts to be disposed can be reduced, and maximum sizes of the protruding part and the recessed part in limited space can be ensured, thereby ensuring structural strength of the protruding parts.

Based on any one of the first aspect, or the first to the third implementations of the first aspect, an embodiment of this application further provides a fourth implementation of the first aspect.

The first connection part and the door plate, the first connection part and the flexible display, and the door plate and the flexible display are all fastened through bonding. Installation process can be simplified.

Based on the fourth implementation of the first aspect, an embodiment of this application further provides a fifth implementation of the first aspect.

Back adhesive areas are respectively disposed on end faces of two sides of the first connection part, and the first connection part is fastened to both the door plate and the flexible display by using a back adhesive layer disposed in a back adhesive area. In this way, stability of bonding between the flexible display and the door plate, between the flexible display and the support plate, and between the door plate and the support plate can be ensured, so as to avoid upwarping or bulging of a part of an edge.

Based on the fifth implementation of the first aspect, an embodiment of this application further provides a sixth implementation of the first aspect.

The first connection part is further provided with a hollowed-out hole, and the first connection part is fastened to both the door plate and the flexible display by using an adhesive dispensing structure at the hollowed-out hole. In the hollowed-out hole, the door plate, the flexible display, and the support plate are directly fastened through bonding by using the adhesive dispensing structure, so that bonding stability can be further enhanced.

Based on any one of the first aspect, or the first to the sixth implementations of the first aspect, an embodiment of this application further provides a seventh implementation of the first aspect.

The support plate is an insulating plate used to avoid impact on use of the electronic device.

Based on any one of the first aspect, or the first to the sixth implementations of the first aspect, an embodiment of this application further provides an eighth implementation of the first aspect.

The support plate is a metal plate, and a surface of the support plate is covered with an insulation layer, so as to avoid the impact on use of the electronic device.

Based on any one of the first aspect, or the first to the eighth implementations of the first aspect, an embodiment of this application further provides a ninth implementation of the first aspect.

Lubricating grease is further applied between the second connection part and the upper end face of the floating plate, so as to avoid wear between the second connection part and the floating plate, thereby protecting the second connection part and the floating plate, and prolonging a service life.

A second aspect of embodiments of this application provides an electronic device, including a flexible display and the foldable assembly according to any one of the first aspect, the first to the ninth implementations of the first aspect.

Technical effects of the electronic device are similar to those of the foregoing foldable assembly. To save space, details are not described herein again.

BRIEF DESCRIPTION OF DRAWINGS

To describe technical solutions in embodiments of this application or in the conventional technology more clearly, the following briefly describes accompanying drawings required for describing embodiments or the conventional technology. Apparently, the accompanying drawings in the following description show some embodiments of the present invention, and a person of ordinary skill in the art may still derive other drawings from these accompanying drawings without creative efforts.

Figure 1:
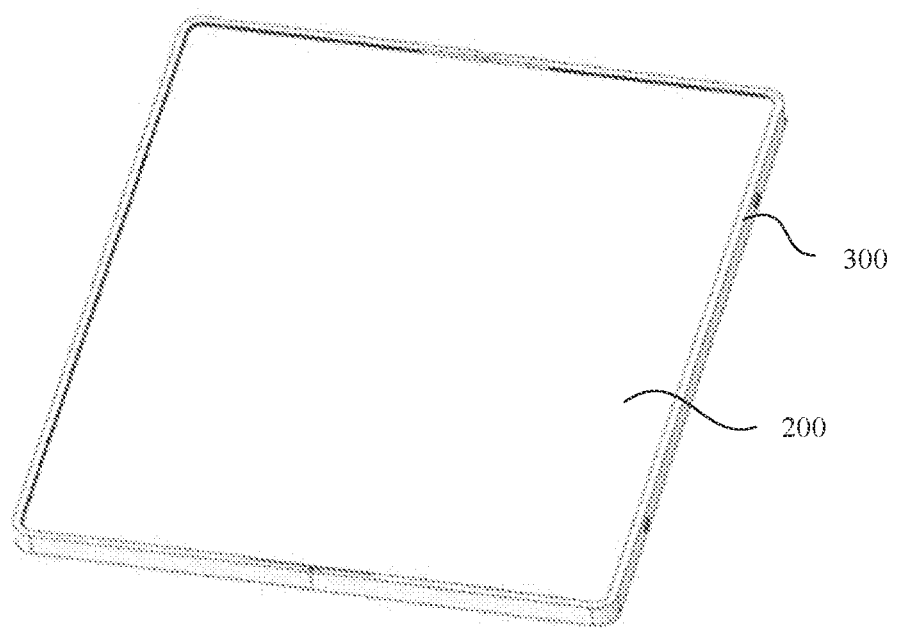
FIG. 1 is a schematic diagram of a structure of an electronic device in an unfolded state according to an embodiment of this application.

Reference numerals in FIG. 1 to FIG. 9 are described as follows:

100—Foldable assembly; 200—Flexible display; 300—Housing;

1—Rotating shaft part, 11—Groove structure, 12—Arc-shaped slide;

2—Floating plate; 21—Wide segment, 22—Narrow segment;

3—Door plate;

4—Support plate, 41—First connection part, 42—Second connection part, 43—Protruding part, 44—Recessed part, 45—Spacing segment, 46—End part, 47—Middle segment, 48—Back adhesive area, and 49—Hollowed-out hole;

5—Main swing arm, 51—Fitting segment, 52—Support structure.

DESCRIPTION OF EMBODIMENTS

To enable a person skilled in the art to better understand technical solutions of this application, the following further describes this application in detail with reference to accompanying drawings and specific embodiments.

Embodiments of this application provide a foldable assembly of an electronic device and an electronic device, where the electronic device may be a terminal product including a foldable flexible display, such as a mobile phone, a tablet computer, a wearable device, a vehicle-mounted device, an augmented reality (augmented reality, AR)/virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 2:
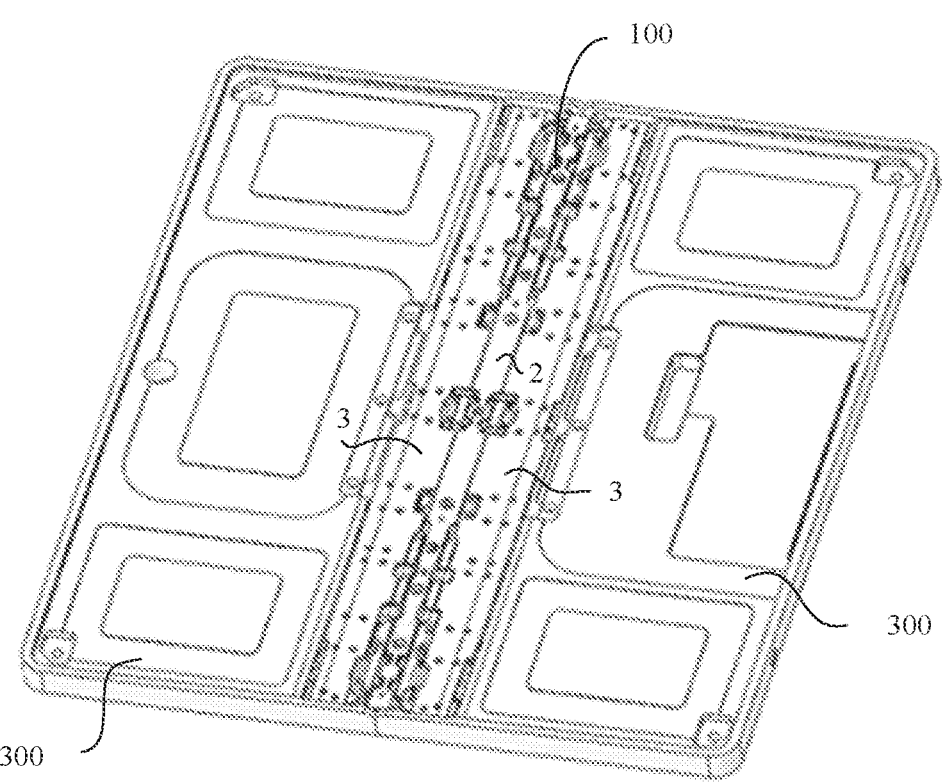
FIG. 2 is a schematic diagram of a structure of an electronic device in an unfolded state after a screen is removed.

As shown in FIG. 1 and FIG. 2, the electronic device includes a flexible display 200, a foldable assembly 100, and a housing 300. The foldable assembly 100 is approximately located in a middle position of the housing 300, and divides the housing 300 into two parts. The two parts may be an integrated structure, or may be a structure with two mutually independent parts that are divided by the foldable assembly 300.

Figures 3, 4:
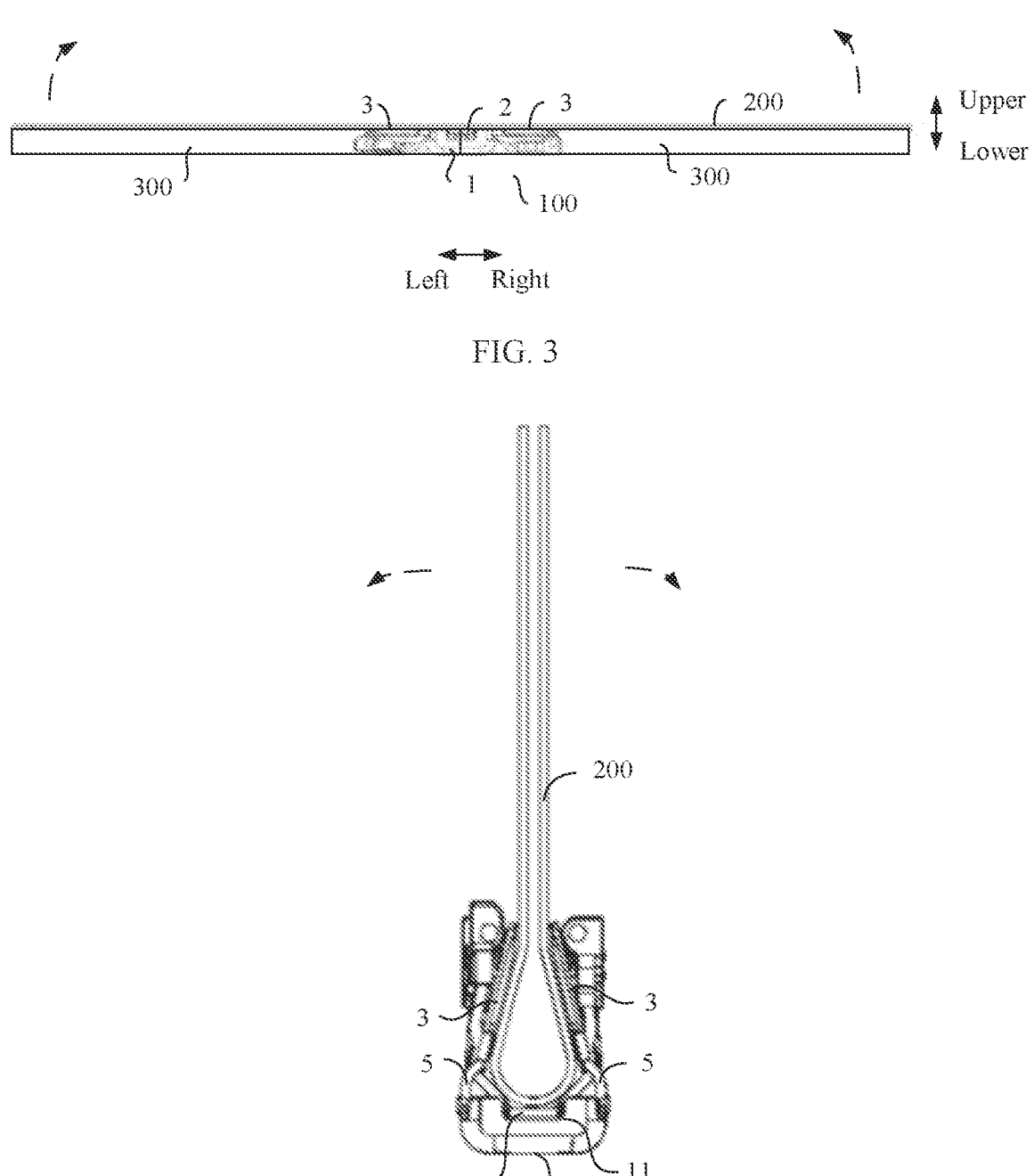
FIG. 3 is a front view of an electronic device in an unfolded state, where transparent processing is performed on a housing.
FIG. 4 is a top view of a foldable assembly in an unfolded state.

As shown in FIG. 3, the foldable assembly 100 includes a rotating shaft part 1 and two door plates 3. The two door plates 3 are respectively located on two sides of the rotating shaft part 1, the door plates 3 can rotate around the rotating shaft part 1, and the two door plates 3 are respectively correspondingly connected and fastened to two parts of the housing 300. In this way, the housing 300 forms a structure that can rotate around the rotating shaft part 1 and implement folding and unfolding. In this embodiment, the two door plates 3 can rotate around the rotating shaft part 1. Specifically, rotation axes of the two door plates 3 are parallel or collinear, and are parallel to a length direction of the rotating shaft part 1.

The flexible display 200 is fastened to an upper end face of the housing 300. In addition, a middle position of the flexible display 200 is further fastened to an upper end face of a door plate 3. As shown in FIG. 3, "upper" means a side facing a user when the electronic device is in use, that is, a side that is of the flexible display 200 and that faces the user when the electronic device is in use. In an unfolded state, as shown in FIG. 3, the upper end face of the door plate 3 aligns with the upper end face of the housing 300, so that the flexible display 200 can be flat in the unfolded state.

Specifically, during use, if the user needs to fold the electronic device in an unfolded state, the housing 300 may be manually operated, so that the two parts of the housing 300 are respectively bent upward in a direction indicated by a dotted arrow in FIG. 3. Specifically, two hands may respectively act on the two parts of the housing 300, so that the housing 300 is bent toward a side on which the flexible display 200 is disposed. In this case, the two parts of the housing 300 can rotate around the rotating shaft part 1 by respectively using the door plates 3, thereby implementing folding. Similarly, when an electronic device in a folded state needs to be unfolded, the housing 300 may be manually operated, so that the two parts of the housing 300 respectively moves to two sides along a direction indicated by a dotted arrow shown in FIG. 4. In this case, the two parts of the housing 300 can rotate to two sides around the rotating shaft part 1 by respectively using the door plates 3, thereby implementing unfolding.

As shown in FIG. 3 and FIG. 4, the foldable assembly 100 further includes a floating plate 2, and the floating plate 2 is disposed between the two door plates 3. A length direction of the floating plate 2, a length direction of the rotating shaft part 1, and a rotation axis of the door plate 3 are parallel to one another. The floating plate 2 can provide support for the flexible display 200 from a position between the two door plates 3. A groove structure 11 is disposed on an upper end face of the rotating shaft part 1 along the length direction of the rotating shaft part 1, and the floating plate 2 is disposed above the groove structure 11 of the rotating shaft part 1. The floating plate 2 can float up and down relative to the rotating shaft part 1. Specifically, during folding, the floating plate 2 can float downward relative to the rotating shaft part 1, the flexible display 200 folds along with the door plate 3, and the middle position of the flexible display 200 floats downward along with the floating plate 2. When a folded state is reached, the floating plate 2 is at least partially located in the groove structure 11, which may specifically be that a part of the floating plate 2 is located in the groove structure 11, or may be that all floating plate 2 enters the groove structure 11.

In this case, a folded flexible display 200 forms a waterdrop-shaped structure between the door plate 3 and the floating plate 2 as shown in FIG. 4. The floating plate 2 can provide protection for the flexible display 200 in a folded state to prevent a fracture at the middle position of the flexible display 200 due to an excessively large bending angle. During unfolding, the flexible display 200 unfolds along with the door plate 2, the floating plate 2 can float upward relative to the rotating shaft part 1, and in an unfolded state, an upper end face of the floating plate 2 and the upper end face of the door plate 3 are aligned, so that the flexible display 200 is provided with a flat support surface, and the flexible display 200 can be spread and unfolded as shown in FIG. 3.

As shown in FIG. 4, the door plate 3 is provided with a main swing arm 5 and an auxiliary swing arm (not shown in the figure), and the main swing arm 5 and the auxiliary swing arm are respectively connected between the door plate 3 and the rotating shaft part 1. The main swing arm 5 can rotate around the rotating shaft part 1, so as to implement rotation of the door plate 3 around the rotating shaft part 1, and the auxiliary swing arm can implement a guide connection function between the door plate 3 and the rotating shaft part 1.

Figure 5:
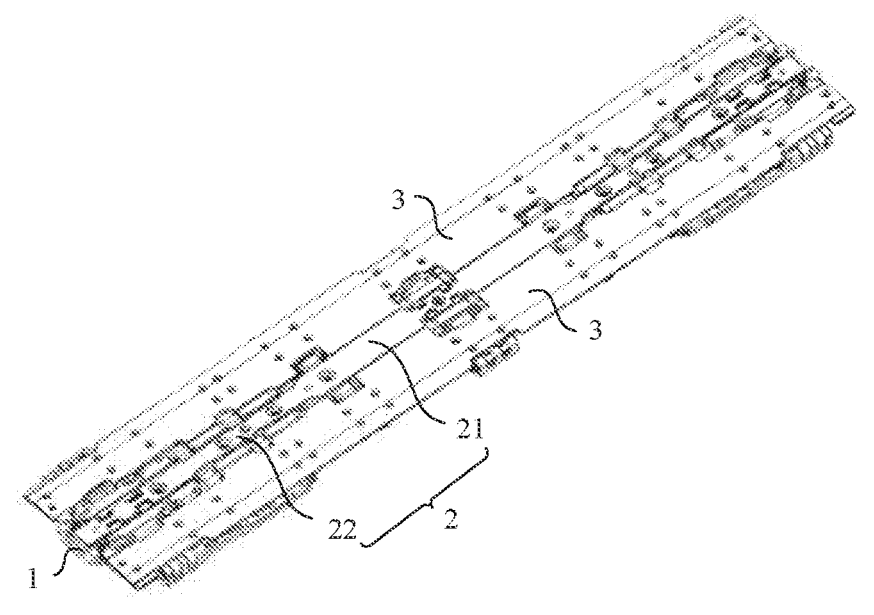
FIG. 5 is a schematic diagram of a structure of a foldable assembly in an unfolded state after a support plate is removed.
Figure 6:
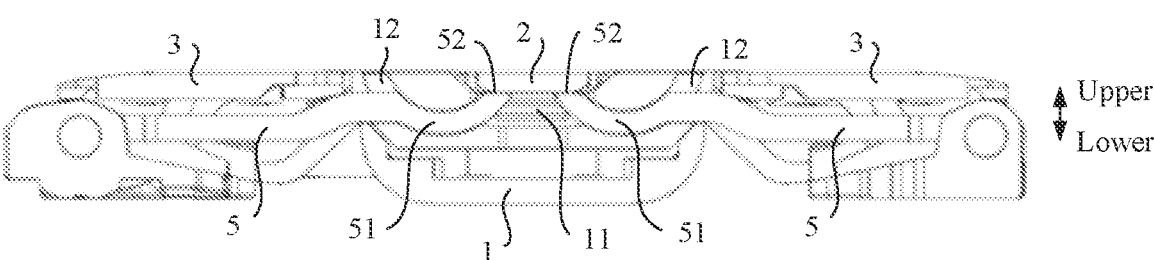
FIG. 6 is a sectional view of FIG. 5.

As shown in FIG. 5 and FIG. 6, the main swing arm 5 is provided with a fitting segment 51, and the rotation shaft part 1 is provided with an arc-shaped slide 12. When rotating around the rotating shaft part 1, the door plate 3 can drive the main swing arm 5 and the auxiliary swing arm to rotate. The fitting segment 51 of the main swing arm. 5 can slide along the arc-shaped slide 12. The arc-shaped slide 12 communicates with the groove structure 11, and an end part 46 on a side of the fitting segment 51 away from the door plate 3 is further provided with a support structure 52. The fitting segment 51 slides along the arc-shaped slide 12 to the support structure 52 to protrude from the arc-shaped slide 12 and enter the groove structure 11. The support structure 52 can provide support for the floating plate 2 from a lower end face, and as the door plate 3 unfolds, the support structure 52 protrudes from the arc-shaped slide 12 and increases in height. In this case, the support structure 52 can support the floating plate 2 to float upward until the door plate 3 is in an unfolded state, the support structure 52 supports the floating plate 2 to stabilize its position, and the upper end face of the door plate 3 and the upper end face of the floating plate 2 are aligned and flat.

Certainty; in this embodiment, the floating plate 2 may alternatively be supported by using the auxiliary swing arm. The auxiliary swing arm is connected to the door plate 3, and in a process in which the door plate 3 rotates around the rotating shaft part 1, the auxiliary swing arm and the lower end face of the floating plate 2 are driven to function, so that the floating plate 2 can float up and down relative to the rotating shaft part 1; alternatively, the main swing arm 5 and the auxiliary swing arm may simultaneously provide support for the floating plate 2. This is not specifically limited herein.

In addition, a spring (not shown in the figure) is disposed in the groove structure 11, and the spring can act on the floating plate 2, so that the floating plate 2 has a tendency of moving into the groove structure 11. That is, the spring can act on the floating plate 2, so that the floating plate 2 floats downward relative to the rotating shaft part 1. Specifically, the spring may be disposed between the lower end face of the floating plate 2 and a bottom wall of the groove structure 11. During folding, the door plate 3 drives the fitting segment 51 to move outward along the arc-shaped slide 12. In this case, the support structure 52 gradually decreases in height and enters the arc-shaped slide 12, and support action of the support structure 52 on the floating plate 2 is removed. The floating plate 2 floats downward under the action of the spring and enters the groove structure 11.

That is, floating of the floating plate 2 relative to the rotating shaft part 1 may be mechanically controlled by the support structure 52 of the main swing arm 5 and/or the auxiliary swing arm and the spring, and performance is stable, so as to ensure that in an unfolded state, the upper end face of the floating plate 2 and the upper end face of the door plate 3 can be aligned, and in a folded state, the floating plate 2 can at least partially enter the groove structure 11.

Figure 7:
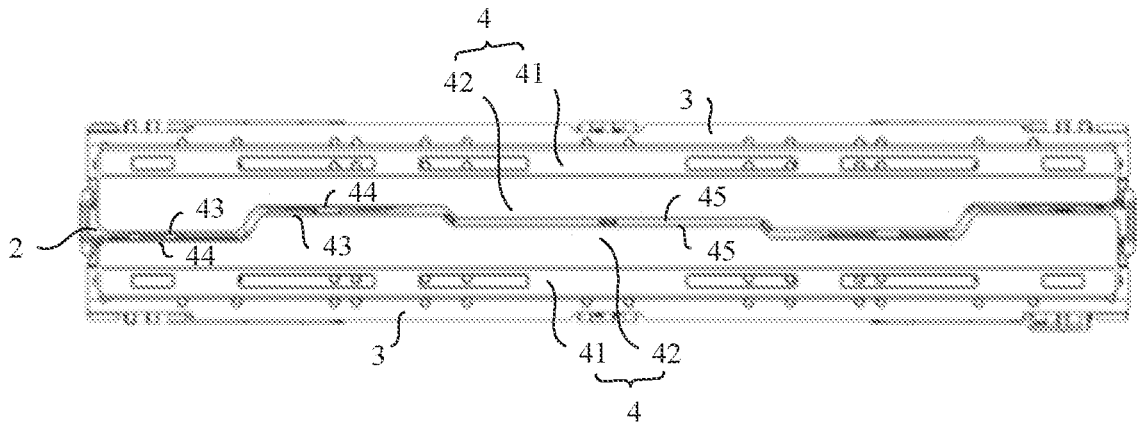
FIG. 7 is a schematic diagram of a structure of an electronic device in a folded state after a housing is removed.

The door plate 3 can rotate around the rotating shaft part 1. The floating plate 2 can float up and down relative to the rotating shaft part 1. There is no direct connection between the door plate 3 and the floating plate 2. Therefore, there is a gap between the door plate 3 and the floating plate 2, especially in a folded state, the door plate 3 folds and rotates upward relative to the rotating shaft part 1, and the floating plate 2 floats downward relative to the rotating shaft part 1. In this case, a gap between the door plate 3 and the floating plate 2 is larger. As shown in FIG. 7, a support plate 4 is disposed between each door plate 3 and the floating plate 2, The support plate 4 includes a first connection part 41 and a second connection part 42. The first connection part 41 is connected to the upper end face of the door plate 3, and second connection parts 42 of two support plates 4 are disposed opposite to each other. The second connection part 42 is located on the upper end face of the floating plate 2, and the support plate 4 can be configured to provide support for the flexible display 200 between the door plate 3 and the floating plate 2.

Specifically, when the door plate 3 rotates around the rotating shaft part 1 and drives the flexible display 200 to rotate to an unfolded state, the floating plate 2 floats upward relative to the rotating shaft part 1 to the upper end face of the floating plate 2 to align with the upper end face of the door plate 3. In this case, the second connection part 42 of the support plate 4 is located on the upper end face of the floating plate 2, and the support plate 4 is in a flat state, and serves as a transition connection between the door plate 3 and the floating plate 2, to ensure overall flatness of the foldable assembly 100, and provide flat support for the flexible display 200, so as to avoid a case in which the flexible display 200 may be easily damaged due to relatively weak local support. When the door plate 3 rotates around the rotating shaft part 1 and drives the flexible display 200 to rotate to a folded state, the floating plate 2 floats downward until the floating plate 2 is at least partially located in the groove structure 11. In this case, the floating plate 2 is located in a lowest position, and a gap between the floating plate 2 and the door plate 3 becomes larger. The first connection part 41 of the support plate 4 moves along with the door plate 3, and the support plate 4 is elastically bent. The second connection part 42 is still located on the upper end face of the floating plate 2, so as to provide transition support for the flexible display 200 between the door plate 3 and the floating plate 2.

In a folded state, the floating plate 2 is at least partially located in the groove structure 11, Disposing the groove structure 11 can reduce a thickness of the foldable assembly 100 at the rotating shaft part 1, and then reduce a protrusion size of the rotating shaft part 1 after the electronic device is folded, so that when a size of a flexible display 200 is given, an overall size after the electronic device is folded can be reduced.

Figure 8:
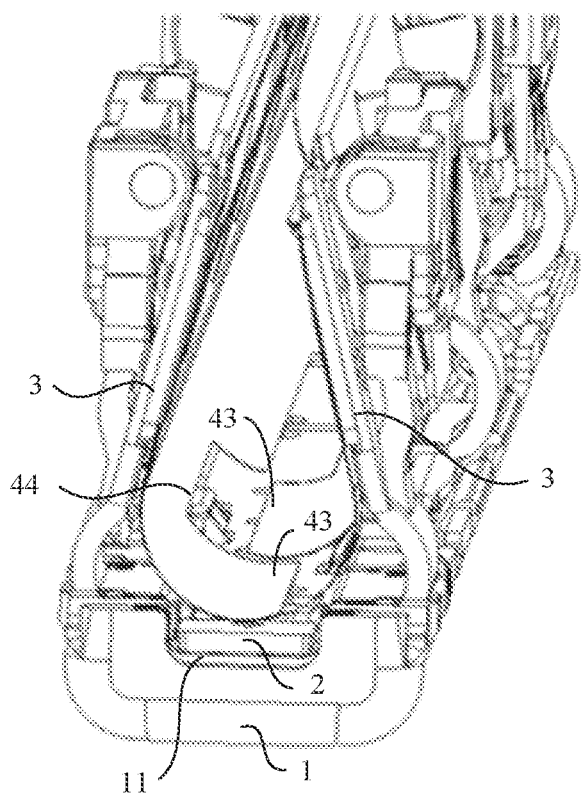
FIG. 8 is a schematic diagram of a structure of a foldable assembly in a folded state.

Because the floating plate 2 can float up and down relative to the groove structure 11, there must be a gap between the floating plate 2 and the groove structure 11. During folding, the first connection part 41 moves along with the door plate 3, and drives two second connection parts 42 to move along the upper end face of the floating plate 2 toward an edge side of the floating plate 2. Because a width of the floating plate 2 is relatively small, to avoid a case in which the second connection part 42 slides along the upper end face of the floating plate 2 to outside of the floating plate 2, and is stuck into a gap between the floating plate 2 and the groove structure 11, in this embodiment, the support plate 4 is disposed as a structure in which the second connection part 42 is provided with a protruding part 43 and a recessed part 44, protruding parts 43 and recessed parts 44 of the two support plates 4 are disposed corresponding to each other; that is, the protruding part 43 of one support plate 4 is disposed corresponding to the recessed part 44 of the other support plate 4, and the recessed part 44 of one support plate 4 is disposed corresponding to the protruding part 43 of the other support plate 4. As shown in FIG. 7, the second connection parts 42 of the two support plates 4 each are not a flat structure, but are correspondingly provided with the protruding parts 43 and the recessed parts 44. In this way, compared with a structure in which the second connection part 42 is disposed as a flat structure, an overall width of the support plate 4 can be increased. During folding, as shown in FIG. 8, the protruding part 4 after bending occurs is still located on the upper end face of the floating plate 2 and abuts against the upper end face of the floating plate 2, to avoid separating from the floating plate 2, and avoid a case of sticking, so as to ensure that the door plate 3 can rotate smoothly and the floating plate 2 can be lifted and lowered smoothly, and then ensure that the flexible display 200 can be folded and unfolded smoothly.

Specifically, in an unfolded state, a structure of the two support plates 4 is shown in FIG. 7. Protruding parts 43 and recessed parts 44 of the two support plates 4 correspondingly fit, and are located on the upper end face of the floating plate 2. In this case, the support plate 4 is flat, and can provide flat support for the flexible display 200 between the door plate 3 and the floating plate 2. When the two door plates 3 rotate around the rotating shaft part 1 and drive the flexible display 200 to fold, the support plate 4 is driven by the door plate 3 to elastically deform. Specifically, the first connection part 41 is driven to be upwarped by the door plate 3, and the second connection part 42 floats downward along with the floating plate 2. However, space in which the floating plate 2 floats downward is limited, so that the support plate 4 may be elastically bent. As shown in FIG. 8, the recessed part 44 is directly driven by the first connection part 41 and separated from the floating plate 2, and the protruding part 43 is bent. However, because a length of the protruding part 43 in a width direction of the floating plate 2 is relatively long, the protruding part 43 still abuts against the upper end face of the floating plate 2 after bending occurs, and does not slide out of an edge of the floating plate 2. Therefore, it can be ensured that in a folded state, a case in which the second connection part 42 of the support plate 4 enters a gap between the floating plate 2 and the groove structure 11 to cause sticking can be avoided. When the door plate 3 drives the flexible display 200 to unfold again, the door plate 3 drives the first connection part 41 of the support plate 4 to unfold toward two sides, the floating plate 2 also floats upward relative to the rotating shaft part 1, and the support plate 4 restores to its original state, and the protruding parts 43 and the recessed parts 44 of the two support plates 4 fit again.

In this embodiment, the two support plates 4 are of the same structure. Specifically, as shown in FIG. 7, when the protruding parts 43 and the recessed parts 44 of the two support plates 4 correspondingly fit, the two support plates 4 are symmetrically disposed about a center between the two support plates. During installation, the first connection part 41 of one support plate 4 is connected to one door plate 3, the other support plate 4 is reversed 180° around an axis along a length direction of the other support plates 4, and is reversed 180° around an axis along a width direction of the other support plate 4, and the first connection part 41 of the other support plate 4 is connected to the other door plate 3. In other words, the protruding part 43 and the recessed part 44 on two sides of a same support plate 4 are also disposed correspondingly, so that the support plate 4 can fit with the other support plate 4 with a same structure. In this way, only a support plate 4 with a same structure needs to be produced, thereby facilitating bulk production, reducing a quantity of molds, simplifying production process, and reducing costs. Certainly, in this embodiment, the two support plates 4 may alternatively be of different structures, provided that the protruding parts 43 and the recessed parts 44 of the two support plates 4 can correspondingly fit.

In this embodiment, a specific arrangement of the protruding part 43 and the recessed part 44 on the second connection part 42 is not limited. For example, the protruding part 43 and the recessed part 44 may be successively arranged in a staggered manner along a length direction of the second connection part 42, or the second connection part 42 is further provided with a spacing segment 45. The spacing segment 45 indicates a structure in which an abutment side of the support plate 4 is not provided with the protruding part 43 or the recessed part 44, and the spacing segments 45 of the two support plates 4 are also correspondingly disposed. In an unfolded state, the protruding parts 43 and the recessed parts 44 of the two support plates 4 correspondingly fit, and the spacing segments 45 correspondingly fit and form a flat structure.

Specifically, disposing the protruding part 43 can increase an overall width of the support plate 4, so as to avoid a case in which the second connection part 42 slides into a gap between the floating plate 2 and the groove structure 11 to cause sticking. A specific arrangement of the protruding part 43 and the recessed part 44 is not limited. The protruding part 43 and the recessed part 44 may be disposed based on a specific case of the electronic device, for example, a length and a width of the floating plate 2.

A structure of the floating plate 2 is not limited. Specifically, because of disposing of a structure of the rotating shaft part 1 and a structure of the door plate 3, a connection between the rotating shaft part 1 and the door plate 3, and the like, a width of each position of the floating plate 2 in a length direction is not consistent. Specifically, the floating plate 2 is provided with a wide segment 21 and a narrow segment 22 in the length direction. It is easy to understand that a width of the wide segment 21 is greater than a width of the narrow segment 22. Because the width of the narrow segment 22 is relatively small, during folding, an abutment side 42 may easily slide along the narrow segment 22 to an edge to cause sticking. Therefore, the abutment side 42 is provided with a fitting segment at a position corresponding to the narrow segment 22. The fitting segment is provided with the protruding part 43 and the recessed part 44, so that a probability that sticking occurs during a folding process can be effectively reduced. A position corresponding to the abutment side 42 and the wide segment 41 is not limited in this embodiment. A protruding part 43 and a recessed part 44 may be disposed; or only a spacing segment 45 is disposed, but a protruding part 43 and a recessed part 44 is not disposed.

Specifically, the structure of the floating plate 2 needs to be disposed based on a surrounding structure. Therefore, a width of the floating plate 2 in a length direction of the floating plate 2 has not only two sizes. In this embodiment, the wide segment 21 refers to a larger part of an overall width, and there is a relatively low probability that the second connection part 42 is stuck on the wide segment 21, while the narrow segment 22 refers to a smaller part of an overall width, and there is a relatively high possibility that the second connection part 42 is stuck on the wide segment 21.

Figure 9:
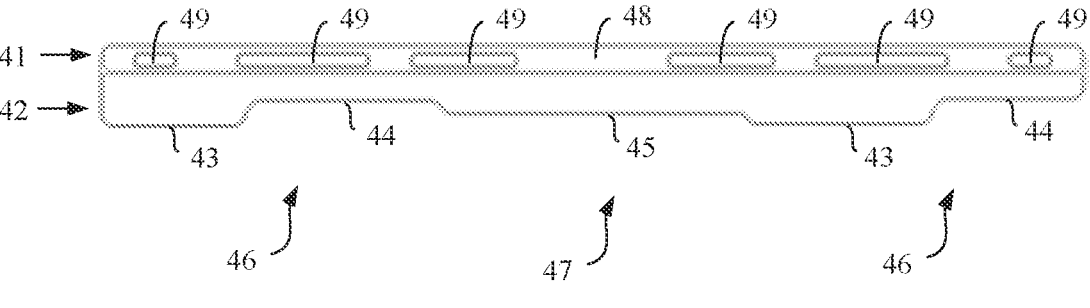
FIG. 9 is a schematic diagram of a structure of a support plate.

For example, the electronic device is a mobile phone. As shown in FIG. 5, a width of two ends of the floating plate 2 in a length direction is relatively small and forms the foregoing narrow segment 22, and a width in a middle part is relatively large and forms the foregoing wide segment 21. Therefore, the foregoing sticking may easily occur at positions of the two ends of the floating plate 2. In this case, as shown in FIG. 9, in a length direction of the second connection part 42, the second connection part 42 of the support plate 4 includes two end parts 46 and a middle segment 47 that is located between the two end parts 46. The two end parts 46 are respectively corresponding to narrow segments 22 at the two ends of the floating plate 2, and the middle segment 47 is corresponding to the wide segment 21 of the floating plate 2. The two end parts 46 form the foregoing fitting segment and is provided with a protruding part 43 and a recessed part 44, and the middle segment 47 is provided with only a spacing segment 45 but no protruding part 43 and no recessed part 44. In this way; sticking is avoided, smoothly folding and unfolding is ensured, and an overall structure of the support plate 4 and production process are simplified Further, quantities of the protruding parts 43 and the recessed parts 44 to be disposed on each end part 46 (that is, a fitting segment) are not limited. As shown in FIG. 9, each end part 46 is provided with one protruding part 43 and one recessed part 44. In this way, the quantities of the protruding part 43 and the recessed part 44 that are disposed can be reduced. In addition, maximum sizes of the protruding part 43 and the recessed part 44 in limited space can be ensured, and structural strength of the protruding part 43 is ensured, so that a case in which when the door plate 3 drives the flexible display 200 to fold, the protruding part 43 is bent to cause a fracture or plastic deformation, or the like can be avoided.

In this embodiment, a specific shape of the protruding part 43 and the recessed part 44 is not limited. As shown in FIG. 9, the protruding part 43 may be set to a trapezoidal structure, or the protruding part 43 may be set to a triangular structure, a square structure, or the like, and alternatively an edge of the second connection part 42 may be set to a leave-shaped structure for a smooth transition.

As shown in FIG. 9, in the second connection part 42 of a same support plate 4, one end part 46 is provided with a protruding part 43 and a recessed part 44 from outside to inside, and the other end part 46 is provided with a recessed part 44 and a protruding part 43 from outside to inside. The outside refers to a side of the end part 46 away from the middle segment 47, and the inside refers to a side of the end part 46 facing the middle segment 47. In this way, two same support plates 4 can fit with each other. In addition, in this embodiment, shape structures of the protruding parts 43 disposed on the same support plate 4 may be the same or different, and the recessed part 44 may be disposed based on a corresponding protruding part 43.

Certainly, the quantities of the protruding parts 43 and the recessed parts 44 to be disposed on the second connection part 42 may be set based on a condition such as a length and a width of the floating plate 2. For example, when the electronic device is a mobile phone, a length of the floating plate 2 is relatively short, and a group of the protruding part 43 and the recessed part 44 may be disposed at each end part 46 of the second connection part 42. When the electronic device is a computer display, a length of the floating plate 2 is relatively long, two or more groups of the protruding parts 43 and the recessed parts 44 may alternatively be disposed at each end part 46 of the second connection part 42.

In this embodiment, the first connection part 41 and the door plate 3 are fastened through bonding, the first connection part 41 and the flexible display 200 are fastened through bonding, and the door plate 3 and the flexible display 200 are also fastened through bonding. Process is relatively simple.

As shown in FIG. 9, upper and lower end faces of the first connection part 41 are respectively provided with back adhesive areas 48, and the back adhesive areas 48 of the first connection part 41 is fastened to both the door plate 3 and the flexible display 200 by using a back adhesive layer. The hack adhesive layer is a sheet structure that basically covers the back adhesive area 48, and the door plate 3 is also fastened to the flexible display 200 by using the back adhesive layer. That is, the first connection part 41 of the support plate 4 is disposed between the door plate 3 and the flexible display 200, and the back adhesive areas 48 on the upper and lower end faces of the first connection part 41 are respectively fastened, through bonding, to the door plate 3 and the flexible display 200 by using the back adhesive layer. In this way, stability of bonding between the flexible display 200 and the door plate 3, stability of bonding between the flexible display 200 and the support plate 4, and stability of bonding between the door plate 3 and the support plate 4 can be ensured, so as to avoid upwarping or bulging of a part of an edge. In addition, it is ensured that in a rotation process, the door plate 3 can drive the flexible display 200 to fold or unfold, and can stably drive the support plate 4 to move, to enable the support plate 4 to elastically deform, to ensure a stable structure. In addition, the housing 300 is also fastened to the flexible display 200 by using a back adhesive layer.

Further, as shown in FIG. 9, the first connection part 41 is further provided with a hollowed-out hole 49, and the first connection part 41 can be further fastened to both the door plate 3 and the flexible display 200 by using an adhesive dispensing structure at the hollowed-out hole 49. That is, when end faces at two sides of the first connection part 41 are respectively fastened to the door plate 3 and the flexible display 200 by using the back adhesive layer, the adhesive dispensing structure is further disposed at the hollowed-out hole 49. The adhesive dispensing structure can be filled with the hollowed-out hole 49, and the adhesive dispensing structure is fastened, through bonding, to the door plate 3 and the flexible display 200 on end faces at two sides of the hollowed-out hole 49, At the hollowed-out hole 49, the door plate 3, the flexible display 200, and the support plate 4 are directly fastened through bonding by using the adhesive dispensing structure, thereby further enhancing bonding stability.

Specifically, in this embodiment, a shape of the hollowed-out hole 49 is not limited. As shown in FIG. 9, the hollowed-out hole 49 may be disposed as a strip structure disposed along a length direction of the support plate 4, or may be disposed as a circular hole structure, a polygonal structure, or the like. Sizes and shapes of hollowed-out holes 49 may be the same or may be different, which may be set based on space of the first connection part 41. The first connection part 41 may be provided with one row of hollowed-out holes 49 spaced along a length direction of the first connection part 41, or may be provided with two or more rows of hollowed-out holes 49. In this embodiment, when the first connection part 41 is provided with only one row of hollowed-out holes 49, bonding stability can be ensured, space requirements on the first connection part 41 can be reduced, and an overall structure and installation process can be simplified. In addition, when the first connection part 41 is only provided with one row of hollowed-out holes 49, a width of the first connection part 41 disposed between the door plate 3 and the flexible display 200 can be further reduced. Therefore, when the door plate 3 rotates and drives the support plate 4 to bend, an overall bending angle of the support plate 4 can be reduced, and a service life of the support plate 4 can be prolonged.

In this embodiment, the support plate 4 is disposed as an insulating plate, to avoid impact on use of the electronic device. Specifically, the support plate 4 may be directly made of an insulating material, for example, a polyethylene plate or a polyfluortetraethylene plate. Alternatively, the support plate 4 may be disposed as a metal plate. In addition, a surface of the metal plate is further covered with an insulation layer, so as to ensure insulativity of the support plate 4.

When the support plate 4 is a metal plate, the back adhesive layer can form an insulation layer in the back adhesive area 48, and the adhesive dispensing structure can form an insulation layer at the hollowed-out hole 49. Therefore, only a part other than the back adhesive area 48 of the support plate 4 needs to be covered with the insulation layer, and process is relatively simple. Specifically, in this embodiment, a material of the insulation layer is not limited; for example, the material may be a polyethylene film or a polytetrafluoroethylene film.

In addition, lubricating grease is further disposed on an outer wall of the second connection part 42. When rotating around the rotating shaft part 1 the door plate 3 can drive the support plate 4 to bend. In this process, the protruding part 43 and the spacing segment 45 may be elastically bent and abut against the upper end face of the floating plate 2. In addition, there is relative sliding between the protruding part 43 and the upper end face of the floating plate 2 and between the spacing segment 45 and the upper end face of the floating plate 2. Therefore, after the lubricating grease is applied between the second connection part 42 and the upper end face of the floating plate 2, wear between the second connection part 42 and the floating plate 2 can be avoided, thereby protecting the second connection part 42 and the floating plate 2, and prolonging a service life.

The principle and implementations of this application are described herein based on specific examples. The descriptions about the embodiments are merely intended to help understand the method and the core concept of this application. It should be noted that a person of ordinary skill in the art may make several improvements or modifications without departing from the principle of this application, and these improvements or modifications shall fall within the protection scope of this application.

What is claimed is:

1. A foldable assembly for an electronic device, wherein the foldable assembly has a folded state and an unfolded state, the foldable assembly comprising:

a rotating shaft part having two sides that are provided with arc-shaped slides, wherein a first side of the two sides has a first arc-shaped slide of the arc-shaped slides, and wherein a second side of the two sides has a second arc-shaped slide of the arc-shaped slides;

two door plates, respectively located at two sides of the rotating shaft part;

a floating plate arranged between the two door plates, wherein the floating plate extends along an axial direction of the rotating shaft part; and two main swing arms, wherein each main swing arm is connected between a corresponding door plate and the rotating shaft part, wherein the main swing arm is configured to rotate around the rotating shaft part to switch the foldable assembly between the folded state and the unfolded state, wherein one end of each main swing arm away from the corresponding door plate is provided with a fitting segment, wherein an end of each fitting segment away from the door plate is provided with a support structure, wherein each fitting segment is configured to slide along a corresponding one of the arc-shaped slides to convert the foldable assembly from the folded state to the unfolded state, and so that each support structure protrudes from the corresponding arc-shaped slide and provides support for a lower end face of the floating plate to float the floating plate upward relative to the rotating shaft part.

2. The foldable assembly of claim 1, wherein a groove structure is disposed on the rotating shaft part and the arc-shaped slides communicate with the groove structure, and wherein when the foldable assembly is converted from the folded state to the unfolded state, each fitting segment slides along the corresponding arc-shaped slide so that the corresponding support structure protrudes from that arc-shaped slide and enters the groove structure and provides support for the lower end face of the floating plate to float the floating plate upward.

3. The foldable assembly of claim 2, further comprising a spring disposed between the floating plate and a bottom wall of the groove structure.

4. The foldable assembly of claim 3, wherein the spring is configured to act on the floating plate to urge the floating plate into the groove structure.

5. The foldable assembly of claim 3, wherein when the foldable assembly is converted from the unfolded state to the folded state, the floating plate floats downward under the action of the spring and enters the groove structure.

6. The foldable assembly of claim 1, wherein each fitting segment comprises a partial cylindrical structure, each fitting segment has an arc surface matched with the arc-shaped slide, and each support structure is an end face of one end of the corresponding fitting segment away from the door plate.

7. The foldable assembly of claim 1, further comprising two auxiliary swing arms, wherein each auxiliary swing arm is connected between a corresponding one of the door plates and the rotating shaft part, and wherein each auxiliary swing arm is configured to implement a guide connection function between the corresponding door plate and the rotating shaft part.

8. The foldable assembly of claim 7, wherein when the door plates rotate around the rotating shaft part, each auxiliary swing arm interacts with the lower end face of the floating plate, so that the floating plate is configured to float up and down relative to the rotating shaft part.

9. The foldable assembly of claim 7, wherein when the door plates rotate around the rotating shaft part, each main swing arm and each auxiliary swing arm simultaneously provide support for the floating plate.

10. The foldable assembly of claim 1, wherein two ends of the floating plate extend along the axial direction of the rotating shaft part to two ends of the rotating shaft part respectively.

11. The foldable assembly of claim 10, wherein a length of the floating plate is equal to a length of the door plate along the axial direction of the rotating shaft part, and two opposite sides of the floating plate along the direction perpendicular to the axial direction of the rotating shaft part are respectively provided with notches.

12. The foldable assembly of claim 10, wherein a length direction of the floating plate, a length direction of the rotating shaft part, and a rotation axis of each door plate are parallel to one another.

13. The foldable assembly of claim 10, wherein an upper end face of the floating plate and an upper end face of each door plate are aligned.

14. An electronic device, comprising:

a flexible display; and a foldable assembly having a folded state and an unfolded state, and configured to support the flexible display, wherein the foldable assembly comprises:

a rotating shaft part having two sides that are provided with arc-shaped slides, wherein a first side of the two sides has a first arc-shaped slide of the arc-shaped slides, and wherein a second side of the two sides has a second arc-shaped slide of the arc-shaped slides;

two door plates, respectively located at two sides of the rotating shaft part;

a floating plate arranged between the two door plates, wherein the floating plate extends along an axial direction of the rotating shaft part; and two main swing arms, wherein each main swing arm is connected between a corresponding door plate and the rotating shaft part, wherein the main swing arm is configured to rotate around the rotating shaft part to switch the foldable assembly between the folded state and the unfolded state, wherein one end of each main swing arm away from the corresponding door plate is provided with a fitting segment, wherein an end of each fitting segment away from the door plate is provided with a support structure, wherein each fitting segment is configured to slide along a corresponding one of the arc-shaped slides to convert the foldable assembly from the folded state to the unfolded state, and so that each support structure protrudes from the corresponding arc-shaped slide and provides support for a lower end face of the floating plate to float the floating plate upward relative to the rotating shaft part.

15. The electronic device of claim 14, wherein when the foldable assembly is converted from the folded state to the unfolded state, the flexible display unfolds with the door plates, and the floating plate is configured to float upward relative to the rotating shaft to provide a supporting surface for the flexible display.

16. The electronic device of claim 14, wherein a groove structure is disposed on the rotating shaft part and the arc-shaped slides communicate with the groove structure, and wherein when the foldable assembly is converted from the folded state to the unfolded state, each fitting segment slides along the corresponding arc-shaped slide so that the corresponding support structure protrudes from that arc-shaped slide and enters the groove structure and provides support for the lower end face of the floating plate to float the floating plate upward.

17. The electronic device of claim 16, wherein the foldable assembly further comprises a spring disposed between the floating plate and a bottom wall of the groove structure, wherein the spring is configured to act on the floating plate to urge the floating plate into the groove structure, and wherein when the foldable assembly is converted from the unfolded state to the folded state, the floating plate floats downward under the action of the spring and enters the groove structure.

18. The electronic device of claim 14, wherein each fitting segment comprises a partial cylindrical structure, each fitting segment has an arc surface matched with the arc-shaped slide, and each support structure is an end face of one end of the corresponding fitting segment away from the door plate.

19. The electronic device of claim 14, further comprising two auxiliary swing arms, wherein each auxiliary swing arm is connected between a corresponding one of the door plates and the rotating shaft part, wherein each auxiliary swing arm is configured to implement a guide connection function between the corresponding door plate and the rotating shaft part, wherein when the door plates rotate around the rotating shaft part, each auxiliary swing arm interacts with the lower end face of the floating plate so that the floating plate is configured to float up and down relative to the rotating shaft part, and wherein when the door plates rotate around the rotating shaft part, each main swing arm and each auxiliary swing arm simultaneously provide support for the floating plate.

20. The electronic device of claim 14, wherein two ends of the floating plate extend along the axial direction of the rotating shaft part to two ends of the rotating shaft part respectively, wherein a length of the floating plate is equal to a length of the door plate along the axial direction of the rotating shaft part, and wherein two opposite sides of the floating plate along the direction perpendicular to the axial direction of the rotating shaft part are respectively provided with notches.

* * * * *